United States Patent [19]

Storm et al.

[11] 4,161,859
[45] Jul. 24, 1979

[54] CROP PICKUP DEVICE

[75] Inventors: Donald P. Storm, Hinsdale; George W. Ridge, La Grange, both of Ill.

[73] Assignee: International Harvester Company, Chicago, Ill.

[21] Appl. No.: 804,969

[22] Filed: Jun. 9, 1977

[51] Int. Cl.² ........................................... A01D 89/00
[52] U.S. Cl. ..................................................... 56/364
[58] Field of Search ........................................... 56/364

[56] References Cited

U.S. PATENT DOCUMENTS

| 2,682,743 | 7/1954 | Hintz | 56/364 |
| 2,893,537 | 7/1959 | Krahn | 56/364 |
| 3,983,683 | 10/1976 | James | 56/364 |

Primary Examiner—Jay N. Eskovitz
Attorney, Agent, or Firm—Dennis K. Sullivan; Neal C. Johnson; F. David AuBuchon

[57] ABSTRACT

A crop pickup device is provided with a tine reel having axially spaced sets of outwardly projecting tines, and crop supporting strippers disposed about the reel between the sets of tines, the strippers having forward lower portions disposed at a uniform radius about an axis below the rotational axis of the tine reel, and a forward upper portion having a substantially larger radius of curvature than the lower forward portion and terminating in a straight trailing portion for attachment to the pickup frame, the projection of the tines beyond said strippers being greater at the upper forward portion than at the lower forward portion.

3 Claims, 3 Drawing Figures

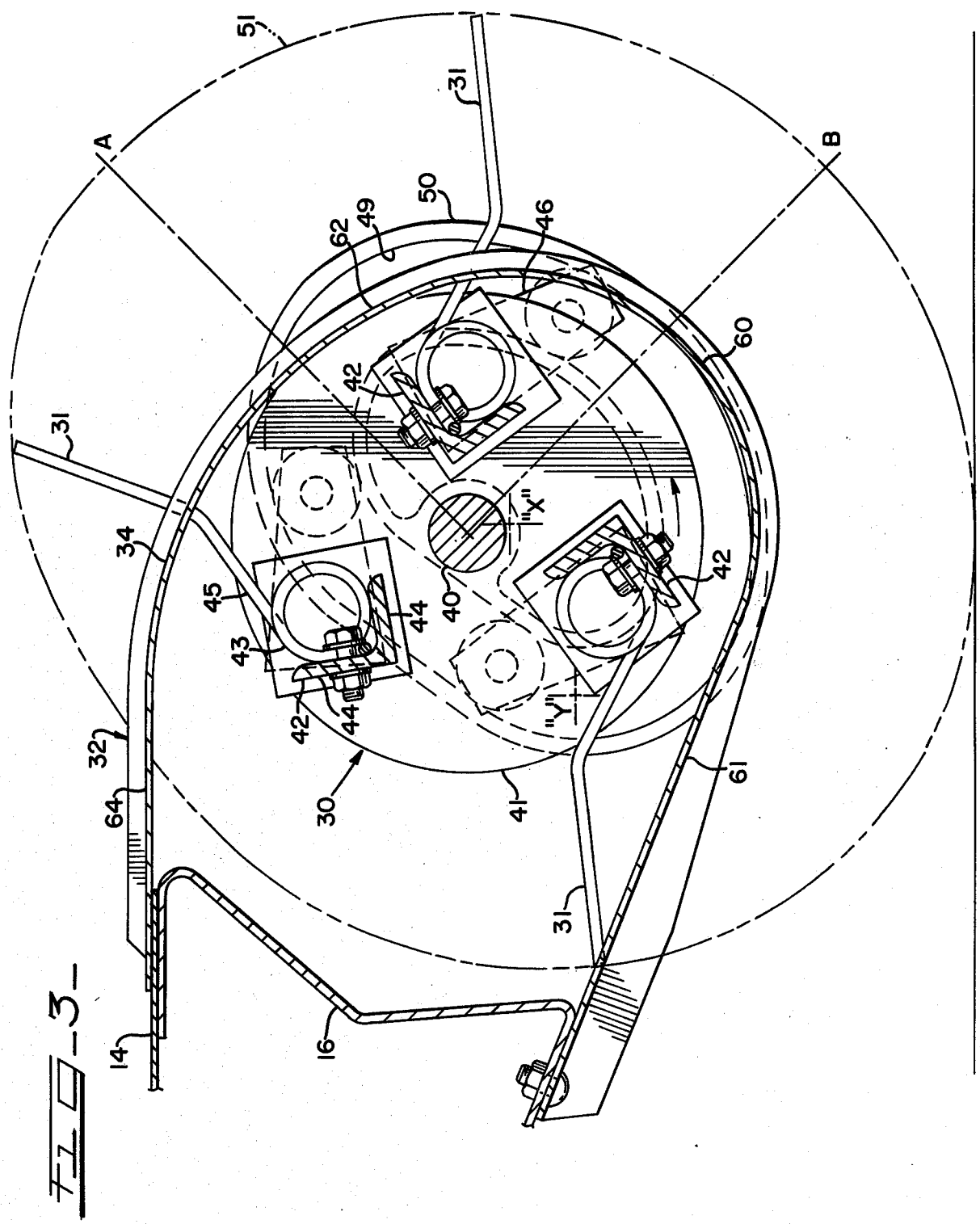

CROP PICKUP DEVICE

BACKGROUND OF THE INVENTION AND THE PRIOR ART

This invention relates to cut crop pickup devices of the type used on forage harvesters, combines, and the like for picking up cut crops and, more particularly, to the tine reel and crop stripper elements thereof which are provided with a novel configuration to effect smoother, more positive handling of the crops as they are raised from the ground to the platform of the machine.

In pickups of the type described, an overshot tine reel having a plurality of sets of tines spaced along a transverse axis is mounted forwardly of the frame of the device. Fore-and-aft extending crop strippers attach to the upper and lower portions of the frame and loop around the tine reel between the sets of tines. In previous machines, the forward portion of these strippers is generally disposed at a uniform radius about the axis of the tine reel. Although cams are sometimes used to control the attitude of the tines relative to the reel, the tines generally extend to their outermost position across the forward portion of the pickup. The result then, with or without a cam, is that the exposed length of the tines from the stripper is uniform across the forward portion of the strippers up to the point where, due to the cam or the stripper-reel geometry, the exposed length of the tines recedes to release the crop as the tines begin to pass around the back side of the reel. As the pickup machine travels forwardly, the radial shape of the forward portion of these prior art strippers tends to roll light short crops into lumps and bunches causing erratic crop flow through the device. The radial shape also tends to cause long stems of heavy tall crops to stand vertically, disrupting crop flow. Both conditions are undesirable.

In U.S. Pat. No. 2,682,743 to Hintz, a somewhat similar stripper profile is used in connection with a lateral gathering pickup device. However, it will be noted that the lower forward portion of the stripper is disposed at a uniform radius about the axis of the tine reel and that the exposed length of tine in the upper forward portion of the reel is the same or less than the exposure in the lower forward portion of the reel. Thus, the Hintz machine would not produce the more positive crop handling resulting from our design.

SUMMARY OF THE INVENTION

In the present invention, a pickup of the type described above is provided with strippers wherein the forward lower portion of the stripper is disposed at a uniform radius, preferably smaller than in conventional strippers, about an axis substantially below the axis of the tine reel and the upper forward portion has a much larger radius of curvature terminating in a straight trailing portion for attachment to the frame of the pickup device and the tine exposure along a line bisecting the upper forward portion is considerably greater than along a line bisecting the lower forward portion. The advantages of this structure are that the flattened effect of the large radius of curvature of the upper portion combined with the lower smaller radius of the forward portion allows a smoother lift of the crops from the ground which improves the flow of the strippers. The increased tine exposure in the forward upper portion provides for more positive handling of short light crops which might otherwise roll back onto the windrow being picked up

DETAILED DESCRIPTION OF THE DRAWINGS

Other advantages of the invention will become apparent upon reading the detailed description of the invention and upon reference to the drawings, in which:

FIG. 3 is a sectional view of the tine reel and strippers of FIG. 2 taken along the line 3—3 thereof.

DETAILED DESCRIPTION OF THE PREFERRED EMBODIMENT

Figure 1:
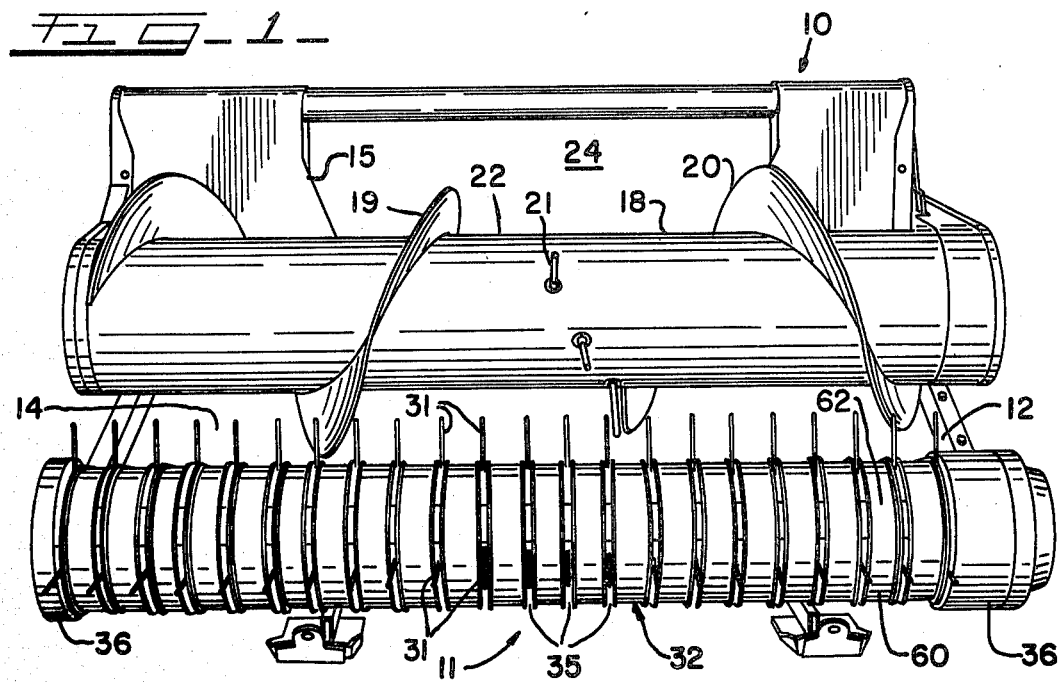
FIG. 1 is a front view of a hay pickup machine incorporating the present invention.

Referring to the drawings, there is shown a crop pickup machine generally designated 10 of the type used on conventional forage harvesters for picking up cut hay laying in windrows or swaths. A crop pickup device generally designated 11 is located at the front of a platform structure 12 having a solid bottom deck 14. The forward portion of the bottom deck 14 is relatively horizontal or slightly downward slanting rearwardly during operation of the machine and continues rearwardly in an upward curve to form the back wall 15 of the pickup machine 10. A frame structure 16, portions of which are shown in FIG. 3, supports the deck 14 as well as the side walls 17 of the pickup machine. An auger conveyor 18 is positioned over the deck 14 and, with its flights 19 and 20, operates to move the crops centrally to fingers 21 extending from the auger core 22 for discharge of the crops into the discharge opening 24 in the rear wall 15 whereat the material is conveyed to an associated processing mechanism, such as a chopper, as is well known to those skilled in the art.

The pickup device 11 is disposed forwardly of the auger 18 in feeding relationship thereto and generally comprises a transverse tine reel generally designated 30 having a plurality of axially spaced sets of tines 31 projecting outwardly thereof and a housing generally designated 32 wrapped thereabout comprising a plurality of crop supporting strippers 34 disposed transversely across the forward portion of the pickup device 11 and defining fore-and-aft extending slots 35 therebetween through which the tines 31 may project. The end caps 36 of the housing 32 are somewhat larger than the strippers 34 disposed therebetween to accommodate the mechanism thereinside as will be seen hereinafter.

Figure 2:
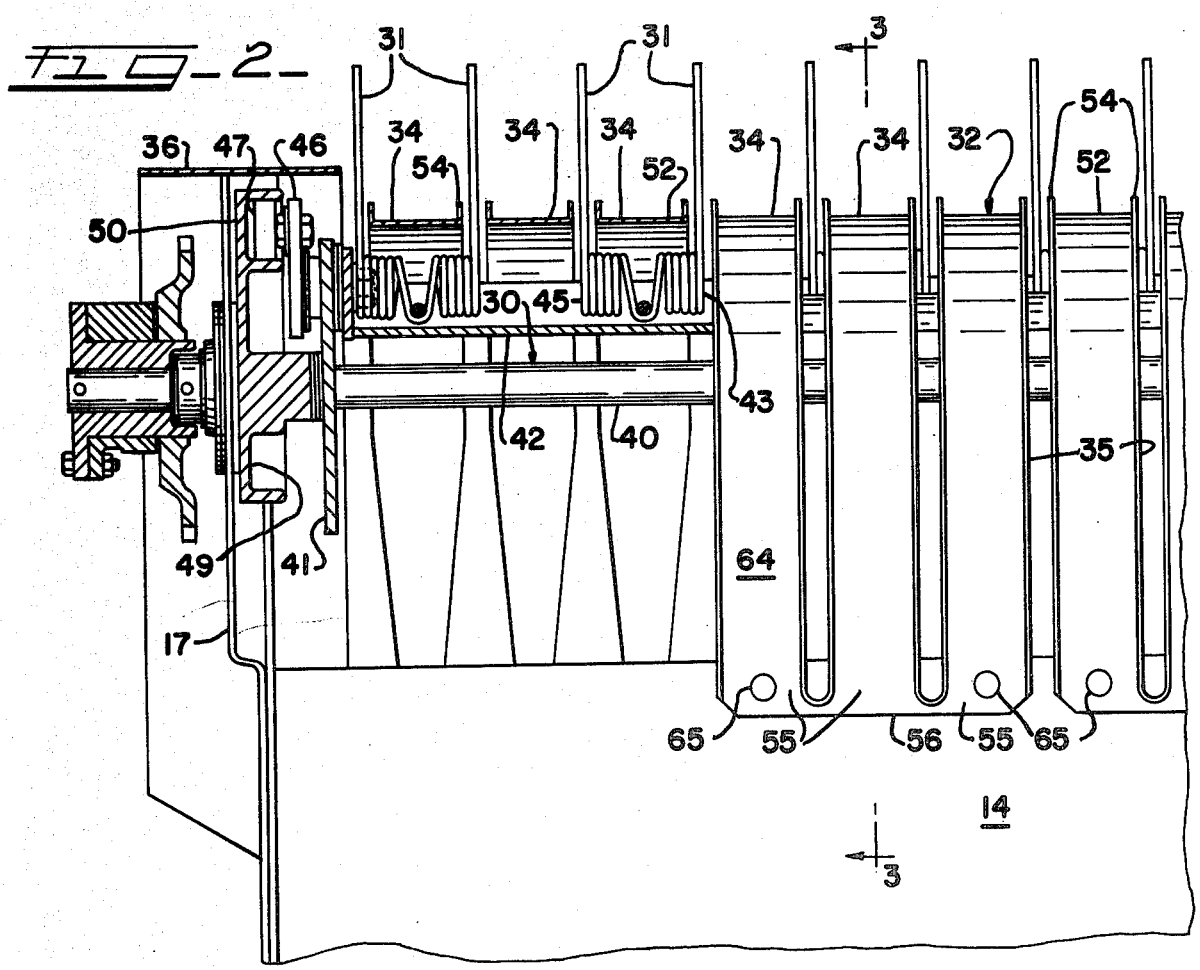
FIG. 2 is enlarged top view partly in section of a portion of the pickup reel and strippers of the hay pickup device of FIG. 1.

Viewed in greater detail as may be seen in FIGS. 2 and 3, it will be seen that the tine reel 30 comprises a center shaft 40 journalled on the side walls 17 and driven in the direction of the arrow on FIG. 3 by any suitable means, such as a chain and sprocket. Near the ends of the reel 30, the shaft 40 is fixed to an annular plate 41 to which three axially extending tine support bars 42 are pivotally mounted in equal spacing about the periphery of the plate 41, the bars 42 comprising angle iron having flanges 44 between which are received the spring bases 43 of tine assemblies 45 which are bolted to the bars 42 and include the tines 31 projecting outwardly from the reel at each end of the bases 43. Cam levers 46 fixed to the left ends of the tine support bars 42 carry rollers 47 which ride in the track 49 of a cam 50 mounted in fixed position on the left side wall 17. As will be seen in FIG. 3, the cam 50 thus controls the attitude of the tines 31 relative to the reel 30, the outer tine periphery being shown at 51. For the purpose hereof, it is sufficient to note that the tines 31 have their outermost extension from the axis of the tine reel 30 through most of the forward portion of the tine periphery 51, start receding at the top portion thereof to release the crop, pass around the rear side of the reel in a receded state for clearance purposes, and extend out again on the bottom side thereof.

Viewing the crop strippers 34 in greater detail, it will be seen in FIG. 2, that each stripper 34 comprises a laterally flat sheet portion 52 having outturned ends 54 adjacent the tine slots 35 to help prevent crop material from entering the interior portion of the housing 32. The strippers 34 are joined at their ends 55 in groups of three into an integral assembly 56 to better maintain the width of the slots 35. Viewing the profile of the strippers 34, as in FIG. 3, it will be seen that the forward lower portion 60 of the stripper 34 relative to the ground is disposed at a uniform radius about an axis "X" which is located a substantial distance below the axis of the reel 30. The rear lower portion 61 of the stripper 34 extends in a tangential direction from the forward lower portion 60 rearwardly to the frame 16 whereat the stripper is attached preferably by bolting. The upper forward portion 62 merges with the lower forward portion 60 and extends with a much larger radius of curvature, preferably uniform relative to the axis "Y" shown in FIG. 3, over the top side of the tine reel 30 and rearwardly to its merger into the front end of a straight upper or top portion 64, which forms an extension of the deck 14, being bolted thereto as at 65 (FIG. 2).

It will be seen from FIG. 3, that the location of the radius of the lower forward portion 60 of the stripper 34 combined with the large radius of curvature of the upper forward portion 62 results in a substantially larger exposure of the tines 31 beyond the stripper 34 in the upper forward portion 62, for example, along a line "A" bisecting the upper forward quadrant of the pickup mechanism relative to the reel axis 40, than in the lower forward portion 60, for example, along a line "B" bisecting the lower forward quadrant, the extension of the tine 31 relative to the axis of the tine reel 30 being at a maximum over this interval. This provides more positive crop handling in the area where lighter crops are most likely to roll back onto the swath. The large radius of curvature on the upper forward portion also promotes smoother crop flow since the elevation of the crops from the ground to the level of the deck 14 takes place over a longer interval of rearward travel of the crops.

Thus there has been provided in accordance with the invention, a crop pickup device which fully satisfies the objects, aims and advantages set forth above. In light of the foregoing description, those skilled in the art will appreciate that certain changes may be made in the preferred embodiment without departing from the true scope of the invention. Accordingly, it is intended to embrace all such changes that fall within the scope of the appended claims.

What is claimed is:

1. A crop pickup mechanism comprising a frame, a tine reel having forward upper and lower quadrants rotatably mounted on the frame and including a plurality of axially spaced sets of tines projecting outwardly from said reel, a plurality of laterally spaced material supporting strippers fixed to the frame and defining fore-and-aft extending slots therebetween for the projection of said tines therethrough, each of said strippers being disposed about said reel and having a forward lower portion disposed at a uniform radius about an axis substantially below the axis of rotation of said tine reel and a forward upper portion having a substantially larger radius of curvature than said forward lower portion, said upper portion terminating in a generally horizontal straight trailing portion for attachment to said pickup frame, the projection of said tines beyond said strippers being substantially greater along a line bisecting the forward upper quadrant of said pickup mechanism than along a line bisecting the forward lower quadrant thereof.

2. The invention in accordance with claim 1 and cam means operatively associated with said cam reel for controlling the attitude of said tines relative to said reel, said tines having their outermost extension relative to the axis of said reel during the interval between said bisecting lines.

3. The invention in accordance with claim 1 and said forward upper portion having a uniform radius of curvature.

* * * * *